Dec. 1, 1964  F. E. WILLIAMS  3,158,977
MOWER BLADE ASSEMBLY
Filed Oct. 19, 1962
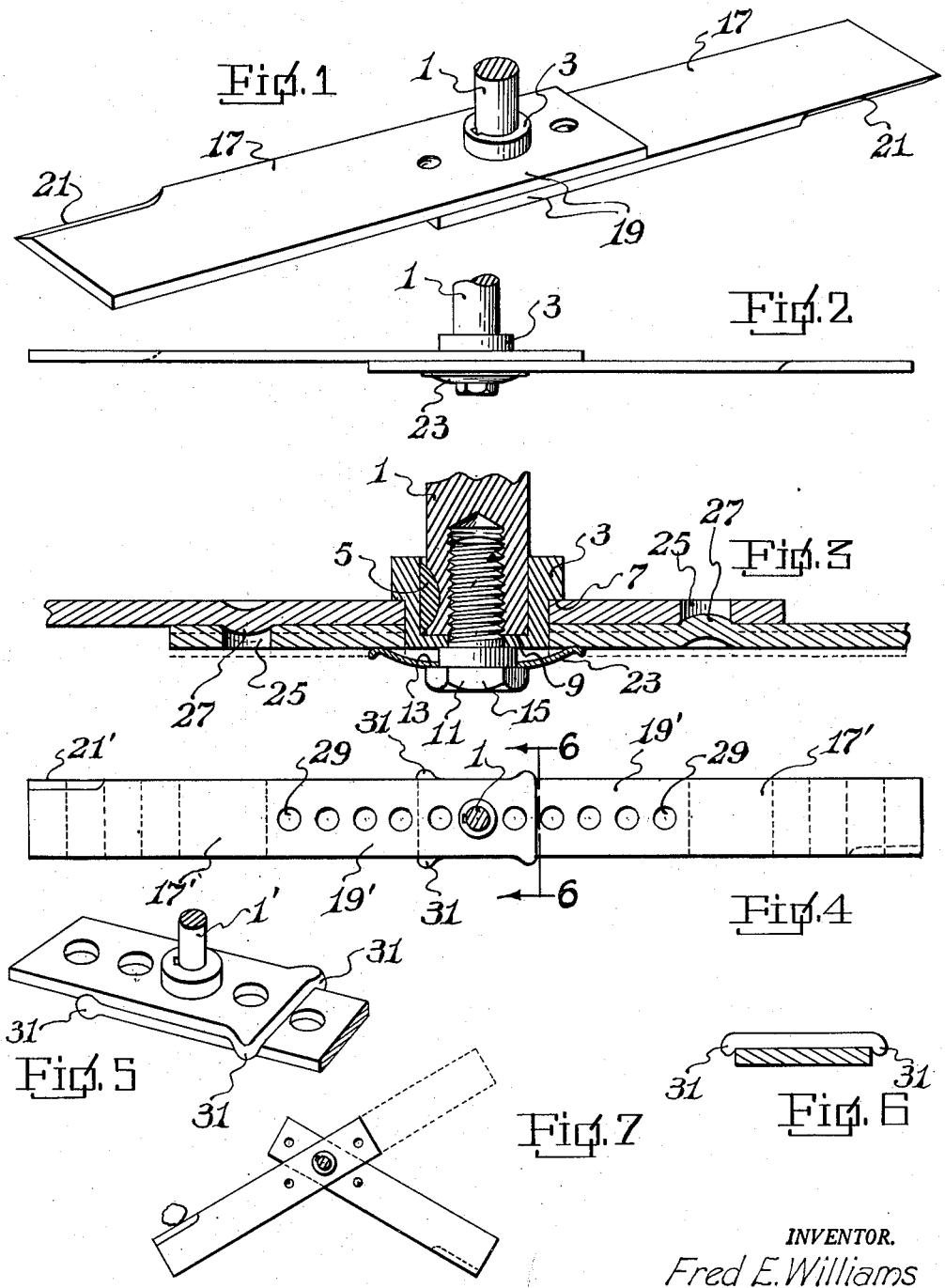
INVENTOR.
Fred E. Williams
BY Robert J. Patch
ATTY.

United States Patent Office 3,158,977
Patented Dec. 1, 1964

3,158,977
MOWER BLADE ASSEMBLY
Fred E. Williams, 1411 N. Sheridan Road, Tulsa, Okla.
Filed Oct. 19, 1962, Ser. No. 231,669
1 Claim. (Cl. 56—295)

The present invention relates to mower blade assemblies, more particularly of the type in which a plurality of blades extend radially outward from a rotatable drive shaft.

It is an object of the present invention to provide a mower blade assembly which will not bend or otherwise injure the drive shaft when one of the blades strikes an obstacle.

Another object of the present invention is the provision of a mower blade assembly in which all the blades may be identical.

Still another object of the present invention is the provision of a mower blade assembly in which a single size of mowers blades may be used for a variety of mower blade assemblies of different cutting radii.

Finally, it is an object of the present invention to provide mower blade assemblies that will be relatively simple and inexpensive to manufacture, easy to assemble and disassemble, maintain and repair, and rugged and durable in use.

Other objects and advantages of the present invention will become apparent from a consideration of the following description, taken in connection with the accompanying drawing, in which:

FIGURE 1 is a fragmentary perspective view of a mower blade assembly according to the present invention;

FIGURE 2 is an elevational view of the structure of FIGURE 1;

FIGURE 3 is an enlarged fragmentary side cross-sectional view of a mower blade according to the present invention;

FIGURE 4 is a plan view of a modified form of the mower blade assembly;

FIGURE 5 is an enlarged fragmentary perspective view of the central portion of the structure of FIGURE 4;

FIGURE 6 is an enlarged cross-sectional view taken on the line 6—6 of FIGURE 4; and FIGURE 7 is a view showing the manner of operation of the mower blade assembly.

Referring now to the drawing in greater detail, there is shown a mower blade assembly including a drive shaft 1. Drive shaft 1 in the illustrated embodiment is of the vertical drive shaft type that depends from a power mower assembly (not shown) which may be entirely conventional. A bushing 3 is secured to the lower end of drive shaft 1 and is held against rotation relative to shaft 1 by a key 5. The upper end of bushing 3 is enlarged and terminates downwardly in an annular downwardly facing shoulder 7. The lower end of bushing 3 is thus reduced in diameter and terminates downwardly in an undersurface that provides a downwardly facing shoulder 9. The lower ends of drive shaft 1 and bushing 3 are drilled and the lower end of drive shaft 1 is internally screw-threaded for the reception of a cap screw 11. Cap screw 11 has a relatively slender screw-threaded shank that terminates in a shoulder that contacts shoulder 9 to limit the distance screw 11 is screwed into the lower end of shaft 1. This shoulder on cap screw 11 firmly and immovably secures bushing 3 to drive shaft 1 and coacts with key 5 to prevent movement of bushing 3 relative to shaft 1. Screw 11 also has a shoulder 13 spaced from shoulder 9 of bushing 3, shoulder 13 being the upper surface of polygonal head 15 of screw 11.

A plurality of mower blades 17 are mounted on drive shaft 1. Each mower blade is provided with an opening through its base portion 19, and drive shaft 1 extends through that opening. In speaking of the "drive shaft," it is of course intended that not only the portion indicated as drive shaft 1 in the drawing but also the bushing 3 and screw 11 be comprehended by this term because they are in unitary assembly with drive shaft 1.

Base portions 19 of blades 17 overlap in a region of overlap that extends a short distance radially outwardly from shaft 1. Beyond the region of overlap, blades 17 extend still farther radially outwardly and terminate in end portions that have cutting edges 21 along their leading edges with regard to the direction of rotation of the mower blade assembly. Mower blades 17 are identical and are in reversed position. Accordingly, base portions 19 are of identical thickness, which in the illustrated embodiment is half the distance between the planes of shoulders 7 and 9 of bushing 3. Thus, when the blades are assembled on the drive shaft as seen in FIGURE 3 with the upper blade in contact with shoulder 7 of bushing 3, the underside of the lower blade will be coplanar with shoulder 9 of bushing 3. A spring washer 23 bears against and acts between shoulder 13 of screw 11 and the underside of the lower blade 17 as seen in FIGURE 3. The exact spacing between shoulder 9 of bushing 3 and shoulder 13 of screw 11, taken with the fact that the underside of the lower blade 17 will be coplanar with shoulder 9 of bushing 3, assures that the planes of shoulder 13 and the underside of lower blade 17 will be spaced apart a predetermined distance. Accordingly, spring washer 23 will be subject to a predetermined compression and will bear with predeterminable force upon the stack of mower blades. Blades 17 would rotate relative to shaft 1 on bushing 3 were it not for spring washer 23. As it is, however, spring washer 23 urges the stack of mower blades against shoulder 7 of bushing 3 with a frictional grip that impedes rotation of blades 17 relative to drive shaft 1. Thus, when drive shaft 1 is driven, blades 17 turn with it until they strike an obstacle that overcomes the friction between the blades on the one hand and bushing 3 and spring washer 23 on the other hand.

A very important feature of the present invention resides in the fact that not only are blades 17 rotatable to a limited degree relative to drive shaft 1, but also they are rotatable to a limited degree relative to each other. Each blade 17 is provided with a recess in the form of an opening 25 therethrough spaced a certain distance on one side of the axis of rotation, and a projecting complementary detent 27 the same distance on the other side of the axis of rotation. When blades 17 are assembled in reversed position as best seen in FIGURE 3, the detent 27 of each blade enters the opening 25 of the other blade. That is to say that the detent of each blade extends from its associated blade beyond the plane of the interface between the overlapping base portion 19 of the blade. The blades 17 are thus rotatable relative to each other about the axis of drive shaft 1, but only upon the imposition of such a couple upon the blades that the detents 27 are cammed out of the openings 25 by a cam action between detents 27 and the marginal edges of openings 25, this cam action forcing the blades 17 apart by a distance equal to the height of detents 27. This movement of mower blades 17 away from each other means that the lower blade as seen in FIGURE 3 will move away from the upper blade while the upper blade remains against shoulder 7 of bushing 3. Spring washer 23 is thus deflected a distance equal to the height of detents 27; and of course it is necessary that spring washer 23 be chosen so that it can undergo this amount of deflection. Thereafter, detents 27 can slide across the adjacent surface of the adjacent blade 17 until the detents 27 ride free from the adjacent blade and base portions 19 are pressed back into contact with each other by spring washer 23. Thereafter, the unobstructed blade can continue to rotate relative to the obstructed blade through and past the position shown in FIGURE 7.

Accordingly, the operation of the device can best be appreciated by describing it in connection with FIGURE 7. As is there shown, the blades are initially in substantial alignment with each other, as indicated by the phantom line in FIGURE 7. When one of the blades strikes an obstruction, the obstructed blade is stopped but the momentum of the unobstructed blade causes it to cam detents 27 out of openings 25 against the action of spring washer 23 and continue clockwise as seen in FIGURE 7. This is a very significant mode of operation, for it means that instead of the entire rotary momentum of blades 17 being suddenly applied at one point to the obstruction and at another point to the drive shaft, with consequent damage to the drive shaft, it is now the rotary momentum of only one blade that is immediately applied as a couple between the obstruction and the drive shaft, the other blade snapping free and more gradually losing its rotative momentum.

A modified form of mower blade assembly is shown in FIGURES 4, 5 and 6, in which primed reference numerals designate the same parts as in the preceding embodiment. The embodiment of FIGURES 4, 5 and 6 differs from the preceding embodiment in that a plurality of openings 29 is provided along the base portion 19' of each blade 17'. As before, the blades 17' are identical and are assembled in reversed relationship. Accordingly, corresponding openings 29 in each blade are aligned with each other and drive shaft 1' extends through these aligned openings. It is possible to align any desired set of openings 29, with the result that a mower blade assembly of any of a plurality of desired radii may be made up from but a single size of blades 17'.

Accordingly, detents and openings corresponding to detents 27 and openings 25 of the preceding embodiment are not used. Instead, detents 31 are provided on each base end corner of each blade. Detents 31 on each blade are spaced apart a distance equal to the width of blade 17', so that the detents 31 on each blade straddle the other blade. As before, the spring washer tends to keep the blades in the position shown in FIGURE 4, but the striking of an obstruction by one blade will permit the other blade to jump the detents and move independently. Accordingly, it will be seen that the two embodiments are the same in their essential operative characteristics, the difference being that the provision of adjustability by means of openings 29 in the latter embodiment dictates the use of a somewhat different form of detent.

From a consideration of the foregoing disclosure, it will be apparent that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

A mower blade assembly comprising a drive shaft, a plurality of mower blades mounted on the drive shaft for rotation relative to the drive shaft and relative to each other with their inner ends overlapping each other and the drive shaft passing through the region of overlap of the blades, the blades being axially movable relative to each other, the blades extending radially of the drive shaft outwardly beyond the region of overlap, the blades having detents thereon in contact with the side edges of an adjacent blade to impede relative movement between the blades, said detents extending from their associated blade to the opposite side of the plane of the interface of the overlapping inner ends of the blades, and means acting on the blades axially of the drive shaft in the region of overlap continuously yieldably to urge the blades together and into frictionally driven relationship with the drive shaft, said means being yieldable an axial distance at least as great as the distance the detents extend beyond said plane so as to permit the blades to move axially apart the latter distance to allow relative movement of the blades when one of the blades strikes an obstacle.

References Cited in the file of this patent
UNITED STATES PATENTS

| | | |
|---|---|---|
| 2,795,916 | Miller | June 18, 1957 |
| 2,856,747 | Kolls | Oct. 21, 1958 |
| 2,978,858 | Moody | Apr. 11, 1961 |
| 3,050,925 | West et al. | Aug. 28, 1962 |
| 3,109,274 | Sheppard | Nov. 5, 1963 |